(12) United States Patent
Larsson

(10) Patent No.: US 10,413,136 B2
(45) Date of Patent: Sep. 17, 2019

(54) STACK OF Z-FOLDED WEB WITH CONNECTOR TO ANOTHER STACK

(71) Applicant: SCA Hygiene Products AB, Göteborg (SE)

(72) Inventor: Björn Larsson, Göteborg (SE)

(73) Assignee: ESSITY HYGIENE AND HEALTH AKTIEBOLAG, Göteborg (SE)

( * ) Notice: Subject to any disclaimer, the term of this patent is extended or adjusted under 35 U.S.C. 154(b) by 0 days.

(21) Appl. No.: 15/319,594

(22) PCT Filed: Jun. 19, 2014

(86) PCT No.: PCT/SE2014/050764
§ 371 (c)(1),
(2) Date: Dec. 16, 2016

(87) PCT Pub. No.: WO2015/195017
PCT Pub. Date: Dec. 23, 2015

(65) Prior Publication Data
US 2017/0135533 A1 May 18, 2017

(51) Int. Cl.
*A47K 10/20* (2006.01)
*A47K 10/34* (2006.01)
(Continued)

(52) U.S. Cl.
CPC .............. *A47K 10/20* (2013.01); *A47K 10/16* (2013.01); *A47K 10/34* (2013.01);
(Continued)

(58) Field of Classification Search
CPC ........ A47K 10/34; A47K 10/36; A47R 10/24; B65H 1/00; B65H 45/24
(Continued)

(56) References Cited

U.S. PATENT DOCUMENTS

| 405,412 | A | * | 6/1889 | Hicks | ............. B32B 29/00 |
| | | | | | 428/43 |
| 1,088,389 | A | * | 2/1914 | Wheeler | ............. A47K 10/421 |
| | | | | | 221/48 |

(Continued)

FOREIGN PATENT DOCUMENTS

| CN | 103648937 A | 3/2014 |
| CN | 103648938 A | 3/2014 |

(Continued)

OTHER PUBLICATIONS

Office Action (Patent Examination Report No. 1) dated Nov. 28, 2016, by the Australian Patent Office in corresponding Australian Patent Application No. 2014398268. (2 pages).

(Continued)

*Primary Examiner* — Rakesh Kumar
(74) *Attorney, Agent, or Firm* — Buchanan Ingersoll & Rooney P.C.

(57) ABSTRACT

A stack of web material for hygiene products, for use in a dispenser, including at least one continuous web material being Z-folded about transverse folding lines, the panels being piled on top of each other to form a height of the stack extending between a first end surface and a second end surface of said stack, and the first end surface being provided with a first connector, and the second end surface being provided with a second connector. At least one of the first and second connectors comprises a first mechanical connector structure and a second mechanical connector structure, the first and second mechanical connector structures being two corresponding structures, each structure being capable of forming a mechanical interconnection with the other structure, and being incapable of forming a mechanical interconnection with an identical structure.

24 Claims, 10 Drawing Sheets

(51) Int. Cl.
  *F16B 1/00* (2006.01)
  *A47K 10/42* (2006.01)
  *A47K 10/16* (2006.01)
  *A47K 10/36* (2006.01)
  *F16B 5/00* (2006.01)

(52) U.S. Cl.
  CPC ........ *A47K 10/3643* (2013.01); *A47K 10/421* (2013.01); *F16B 1/00* (2013.01); *F16B 5/0084* (2013.01); *A47K 2010/428* (2013.01); *F16B 2001/0028* (2013.01)

(58) Field of Classification Search
  USPC .......................................................... 221/48
  See application file for complete search history.

(56) References Cited

U.S. PATENT DOCUMENTS

| | | | | |
|---|---|---|---|---|
| 1,208,701 | A * | 12/1916 | Trenner | A61F 15/001 206/440 |
| 1,685,395 | A * | 9/1928 | Borroughs | A47K 10/24 312/34.5 |
| 2,809,082 | A * | 10/1957 | Marcuse | A47K 10/34 221/42 |
| 3,391,434 | A * | 7/1968 | Girard | A44B 18/0073 160/354 |
| 4,516,711 | A * | 5/1985 | Barege | A47K 10/34 225/20 |
| 4,657,000 | A * | 4/1987 | Hepburn | A61F 5/0102 602/16 |
| 4,915,993 | A | 4/1990 | Ten Wolde | |
| 5,033,620 | A * | 7/1991 | De Luca | A47K 10/34 206/449 |
| 5,231,738 | A | 8/1993 | Higashinaka | |
| 5,369,853 | A | 12/1994 | Okawa et al. | |
| 5,520,308 | A * | 5/1996 | Berg, Jr. | B65D 83/0847 206/233 |
| 5,669,120 | A * | 9/1997 | Wessels | A44B 18/0034 24/445 |
| 6,018,852 | A * | 2/2000 | Coslovi | A44B 18/003 24/304 |
| 6,213,346 | B1 * | 4/2001 | Skerrett | A47K 10/42 221/48 |
| 6,250,530 | B1 * | 6/2001 | LaCount | A47K 10/3687 225/10 |
| 6,286,712 | B1 * | 9/2001 | Craig | B65H 45/24 206/494 |
| 6,550,633 | B2 * | 4/2003 | Huang | A47K 10/42 221/45 |
| 6,728,998 | B2 * | 5/2004 | Wang | A44B 18/0023 24/265 WS |
| 7,045,033 | B2 * | 5/2006 | Bar-Erez | B32B 38/10 156/255 |
| 7,413,225 | B2 | 8/2008 | Spurr | |
| 7,487,873 | B2 * | 2/2009 | Larsson | B65D 75/52 206/449 |
| 8,342,360 | B2 * | 1/2013 | Long | B65D 83/0894 206/209 |
| 8,765,246 | B2 * | 7/2014 | Mockli | B41F 13/64 428/121 |
| 8,857,611 | B2 * | 10/2014 | Thorburn | A47K 10/424 206/233 |
| 9,004,313 | B2 * | 4/2015 | Andersson | B65H 45/24 206/449 |
| 9,700,105 | B2 * | 7/2017 | Kaikou | A44B 18/003 |
| 9,808,131 | B2 * | 11/2017 | Larsson | B65H 45/24 |
| 2001/0020626 | A1 * | 9/2001 | Skerrett | A47K 10/42 221/48 |
| 2004/0245140 | A1 * | 12/2004 | Larsson | B65D 75/52 206/494 |
| 2009/0025167 | A1 * | 1/2009 | de Jong | A47K 10/24 15/210.1 |
| 2011/0101020 | A1 * | 5/2011 | Granger | A47K 10/424 221/45 |
| 2011/0108202 | A1 * | 5/2011 | Maurice | B65H 23/1882 156/537 |
| 2014/0134376 | A1 * | 5/2014 | Larsson | B65H 45/24 428/43 |
| 2014/0230123 | A1 | 8/2014 | Kaikou et al. | |
| 2014/0291186 | A1 | 10/2014 | Andersson et al. | |
| 2016/0120377 | A1 * | 5/2016 | Larsson | B65H 45/24 428/99 |

FOREIGN PATENT DOCUMENTS

| | | | | |
|---|---|---|---|---|
| EP | 0302382 A1 * | 2/1989 | .......... A47K 10/421 |
| GB | 972648 A | 10/1964 | |
| WO | WO 2009029522 A2 * | 3/2009 | .......... B31D 5/0047 |
| WO | WO 2013/007301 A1 | 1/2013 | |
| WO | WO 2013007301 A1 * | 1/2013 | ............ B65H 45/24 |
| WO | WO 2013007303 A1 * | 1/2013 | ............ B65H 45/24 |
| WO | WO 2013/029678 A1 | 3/2013 | |
| WO | WO2013029678 * | 3/2013 | ............ B65H 45/20 |
| WO | WO 2013029678 A1 * | 3/2013 | ............ B65H 45/20 |
| WO | WO-2013029678 A1 * | 3/2013 | ............ B65H 45/20 |
| WO | WO 2013/047098 A1 | 4/2013 | |
| WO | WO 2014065733 A1 * | 5/2014 | .......... A47K 10/422 |

OTHER PUBLICATIONS

International Search Report (PCT/ISA/210) dated Mar. 12, 2015, by the Swedish Patent Office as the International Searching Authority for International Application No. PCT/SE2014/050764.

Written Opinion (PCT/ISA/237) dated Mar. 12, 2015, by the Swedish Patent Office as the International Searching Authority for International Application No. PCT/SE2014/050764.

Office Action (Search Report) dated Mar. 1, 2018, by the Federal Service on Industrial Property in Russian Patent Application No. 2017101575/12(002644) and an English Translation. (4 pages).

Extended European Search Report dated Mar. 19, 2018, issued by the European Patent Office in corresponding European Application No. 15809880.6-1005. (12 pages).

Office Action (Notification of the First Office Action) dated Jul. 26, 2018, by the State Intellectual Property Office of the People's Republic of China in corresponding Chinese Patent Application No. 201480079937.0, and an English Translation of the Office Action. (24 pages).

Office Action issued by the Colombian Patent Office in Colombian Patent Application No. NC2016/0005905 and a partial English Translation of the Office Action. (7 pages).

Office Action dated Jun. 15, 2018, by the Colombian Patent Office in corresponding Colombian Patent Application No. NC2016/0005905. (15 pages).

Office Action dated Nov. 5, 2018, by the Chilean Patent Office in corresponding Chilean Patent Application No. 201603183, with English language summary (11 pages).

Office Action dated Mar. 7, 2019, by the State Intellectual Property Office (SIPO) of the People's Republic of China in corresponding Chinese Patent Application No. 201480079937.0, with English language summary (24 pages).

* cited by examiner

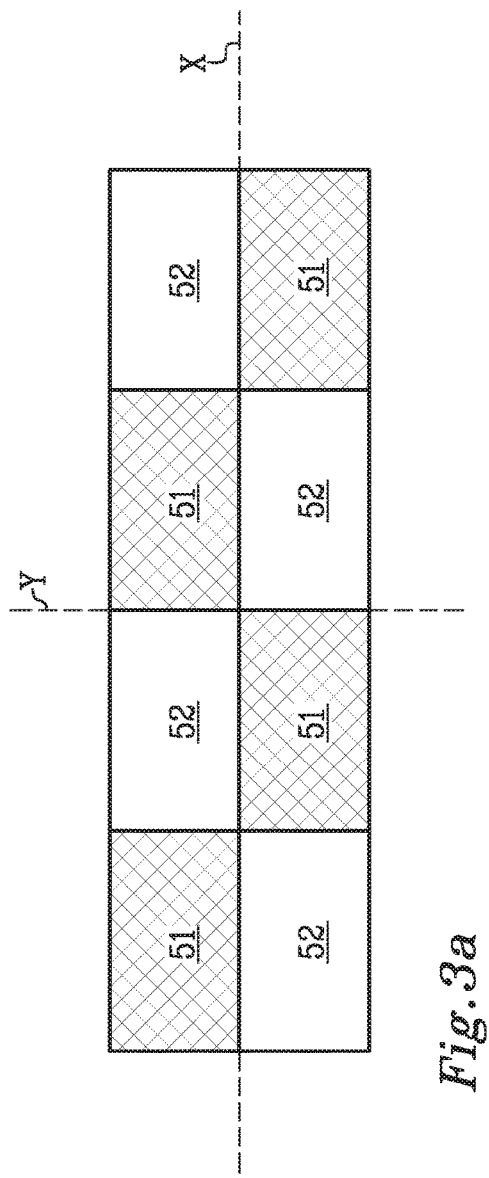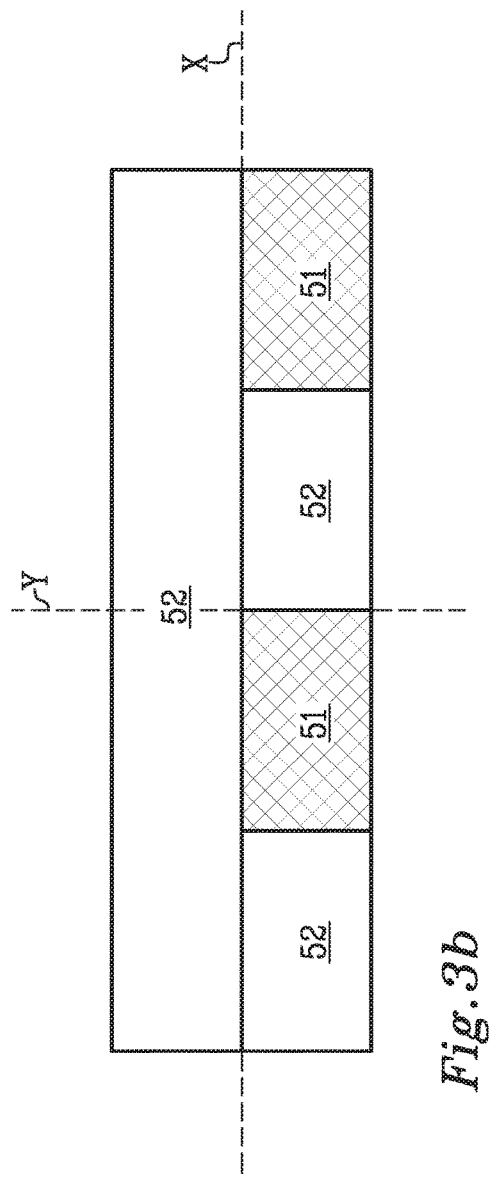

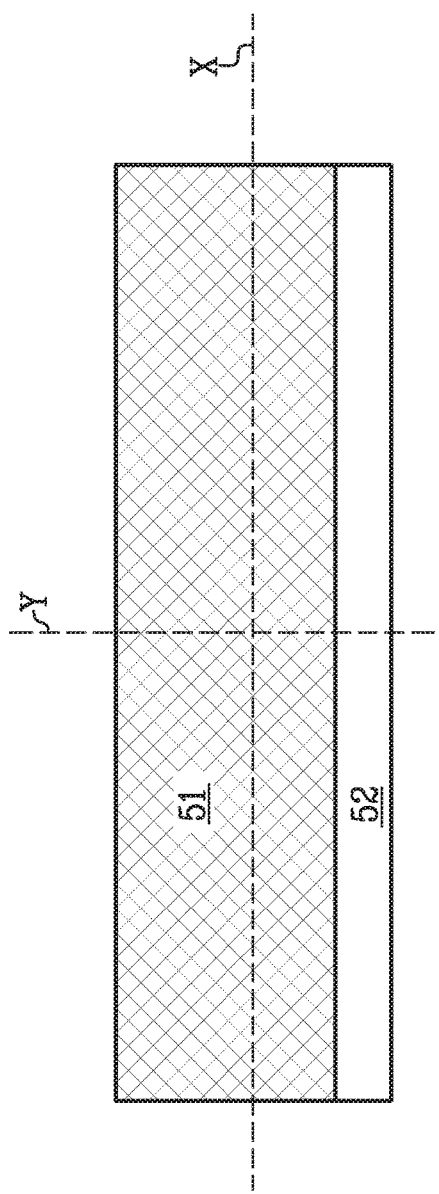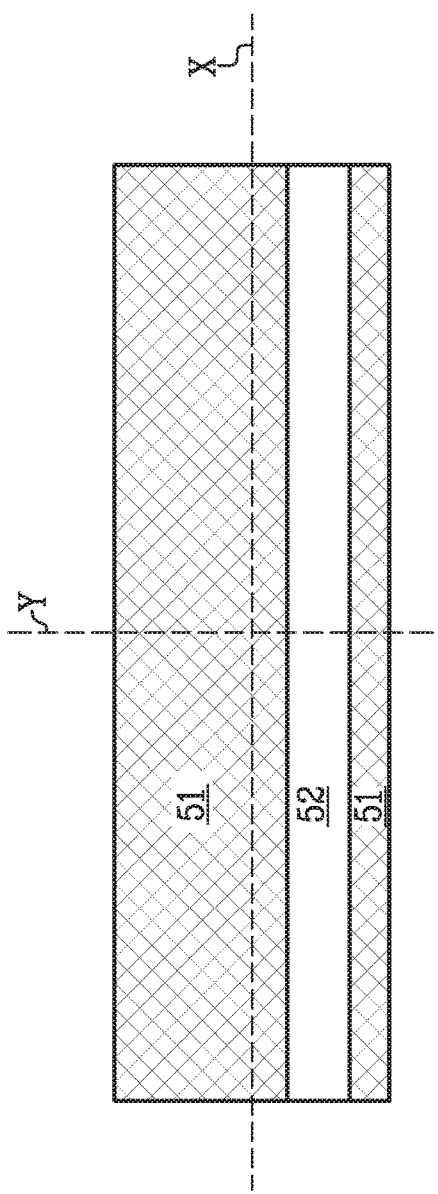

STACK OF Z-FOLDED WEB WITH CONNECTOR TO ANOTHER STACK

TECHNICAL FIELD

The present disclosure relates to a stack of web material for hygiene products, for use in a dispenser comprising at least one continuous web material being Z-folded about transverse folding lines, thereby providing-panels having a length and a width, said panels being piled on top of each other to form a height of said stack.

BACKGROUND

Dispensers with web material, such as paper towels, napkins and similar hygiene products are often used in public lavatories as a convenient way of providing a supply of towels in washrooms and other facilities. Similar dispensers with web material are provided for supplying hygiene products intended for object wiping, e.g. for cleaning.

The web material may be provided as a pile of folded web, arranged in a storage space of the dispenser.

Dispensers for folded web material need frequently to be refilled with new web material. It is preferred that the refilling of web material should not be heavy or difficult for the attendant to perform. Conventionally, refill packages are provided, each refill package comprising a stack of web material and a wrapping, which maintains the integrity of the stack during transport and storage thereof. For refill of the dispenser, the wrapping is removed from the stack, whereafter the stack is introduced into the storage space of the dispenser. Hence, each package is opened and fed to the dispenser by the attendant.

Accordingly, conventional packages of web material are provided in sizes that are not too heavy and which easily can be gripped by the attendant, such that the integrity of the stack may be maintained manually while introducing the stack into the storage space of the dispenser.

The stacks may be adhered to each other via their respective end panels, so that an end panel of each stack pulls along an end panel of the next stack, forming a compound stack (i.e. a pile) of folded web material to be dispensed.

To this end, adhesive tape or glue may be applied to the outer panel(s) of the stacks. Refill of a dispenser with the presently available stacks of web material may hence involve the unwrapping, introduction and subsequent adhesion of several stacks of web material.

Accordingly, the refill of a dispenser may be rather time-consuming.

Thus, there is a continuing need for an improved product refill procedure.

SUMMARY

There is provided a stack of web material for hygiene products, for use in a dispenser, comprising at least one continuous web material being Z-folded about transverse folding lines, thereby providing panels having a length and a width, the panels being piled on top of each other to form a height of the stack extending between a first end surface and a second end surface of the stack, the first end surface being provided with a first connector, and the second end surface being provided with a second connector.

At least one of the first and second connectors comprises a first mechanical connector structure and a second mechanical connector structure, the first and second mechanical connector structures being two corresponding structures, each structure being capable of forming a mechanical interconnection with the other structure, and being incapable of forming a mechanical interconnection with an identical structure, whereby the at least one of the first and second connectors is mechanically connectable to another connector of another stack of web material, the another connector comprising the first and/or second mechanical connector structure.

By "continuous web material" is meant a material which may be continuously fed for example when arranged in an appropriate dispenser. The web material may be integral, and intended to be severed into individual products upon actuation or a user, e.g. by a cutting blade or edge arranged in an appropriate dispenser. Alternatively, the continuous web material may be provided with weakening lines, such as perforation lines, along which the web material is to be separated to form individual products. Such separation can take place automatically inside a dispenser, or be performed manually.

With first and second connector is meant e.g. a portion of material which potentially (if in contact with another connector) may perform interconnection of the stack to another stack.

The connector structures are to be connector structures for mechanically interconnecting the end surfaces of the stacks to other, similar stacks, as is required when the stacks are to be used in a dispenser having a storage space intended for housing several interconnected stacks.

Mechanical connectors have the advantage of providing a secure connection between themselves, whilst not being prone to unwanted connection to other materials, such as to the material web itself. Hence, use of mechanical connectors facilitates the general handling of the stacks.

In many dispensers, particularly in dispensers of a relatively large size, the web material is to be run along a web path and through a number of devices before being fed to a user. Such devices could include various rollers, cutters, perforation cutters, and the like. Mechanical connectors may be designed such that they may pass these various devices without hindering the web, and without leaving residues on the devices themselves.

Mechanical connectors may often be of a type where the connection is accomplished by a pair of two different, corresponding interconnectable connector structures. The first connector structure is hence capable of forming a mechanical interconnection with a second connector structure, but not with another first connector structure (i. e. an identical structure). Similarly, the second connector structure is capable of forming a mechanical interconnection with the first connector structure, but not with another second connector structure (i. e. an identical structure). A typical example of such connector structures is a hook structure and a corresponding loop structure.

It is proposed herein that at least one of the first and second connectors, arranged on an end surface of the stack, is to comprise first and second connector structures.

In accordance with the above, a stack is provided which enables facilitated loading into a designated dispenser, since the at least one connector comprising both first and second connector structures is mechanically connectable to other connectors comprising a first connector structure only, a second connector structure only, or both first and second connector structures.

Accordingly, the versatility of the connection between the stacks is increased, and a connection between stacks which may be performed independently of the relative orientation of the connectors (i.e. of the stacks) is enabled.
}

When a connector of a first stack is to be connected to a connector of a second stack, there is a plurality of ways in which the connectors may meet. First, the first connector of the first stack may meet the first or the second connector of the other stack, and vice versa. Second, each connector of the first stack and of the second stack may be rotated along a central axis parallel to the height of the stack, resulting in a number of different relative rotational positions. When the width of the stack is different from the length of the stack, which is often the case with folded web shaped material, the number of relative rotational positions is restricted to those positions where the lengths and widths of the two stacks coincide. With the orientation of a connector or of an end surface is meant herein all of the above mentioned various positions in space.

This is in contrast to a stack where e.g. the first connector comprises the first connector structure only, and the second connector comprises the second connector structure only, in which case each stack must be positioned with a first connector towards a second connector of another stack (or vice versa) to achieve mechanical interconnection. In such a case, the person performing the loading operation must generally be provided with an instruction how to load the stacks, and the person must also correctly follow the instruction in order to achieve he interconnection. If the connectors are centrally arranged on the respective end surfaces of the stacks, the likelihood of achieving an interconnection between the two stacks if no attention is made to the orientation of the connectors will be 50%.

However, as will be explained In the below, using connectors comprising a first and a second connection structure enables the provision of stacks where the likelihood of achieving an interconnection between two stacks when no attention is made to the orientation of the connectors is greater than 50%, in some cases up to 100%.

To provide an interconnection, it is generally not required that the entire surface area formed by the first connector structure and/or the second connector structure of a connector is interconnected to a second and/or first connector structure of another connector. With mechanical connectors, sufficient connection strength may be achieved already with relatively small interconnected areas of connector structures. Hence, to provide an interconnection, it may be sufficient that the connectors are designed so as to enable interconnection between a portion of the first connector structure and a portion of a corresponding second structure, or vice versa.

The versatility of the connection between the stacks, and the likelihood of an interconnection resulting when no attention is made to the orientation of the stacks, may be improved by providing only one out of the first and the second connectors of the stack with both the first and the second mechanical connector structure.

However, each one of the first and second connectors may comprise the first mechanical connector structure and the second mechanical connector structure. This may further increase the versatility of the connection between stacks, and enable more variants with high likelihood of interconnection.

In certain variants, the first and second connectors may be different.

In certain variants, the first and second connectors may be similar.

The first and the second connector structures may he randomly arranged on the at least one connector. In this case, the first and second connector structures may be provided by a connector material on which first and second connector structures are formed in a random arrangement. For example, such a connector material could be a compound material designed to interconnect with an identical compound material, comprising randomly arranged first and second connector structures, e.g. randomly arranged hooks and loops protruding from a common backing material. Alternatively, the first and second connector structures per se could be arranged in an organised manner on a common backing material, but on a scale which will still result in a random arrangement as seen over the at least one connector.

Alternatively, at least one out of the first and second connector structures may be arranged to form a pattern over the corresponding end surface of the stack. With "a pattern" is meant herein an organised arrangement, of at least one area comprising the first connector structure, and at least one area comprising the second connector structure, in contrast to the random arrangement as described in the above.

Such a pattern may be formed by various types of connector materials as will be described in the below. The pattern may be selected in various manners to provide sufficient likelihood of interconnection between the connectors.

If preferred, such a pattern may be adapted such that the at least one end surface is mechanically connectable to an identical end surface, (i.e. provided with an identical pattern) of another stack of web material. If both end surfaces are provided with identical patterns of this type, a plurality of identical stacks may be provided, wherein each first and second end surface of a stack is connectable to each first and second end surface of the other stacks.

With "identical" is meant herein something which is sufficiently identical considering the intended purpose of the features. Manufacturing tolerances or slight variations which do not affect the function of the feature is to be comprised in the term "identical".

Alternatively, such a pattern may be adapted such that the at least one end surface is mechanically connectable to an a different end surface, (e.g. provided with a different pattern) of another stack of web material.

That the end surfaces are mechanically connectable means that they may be connected, at least if a first or second end surface is provided with a specific orientation relative to the first or second end surface of another stack.

The first and second end surfaces may define a longitudinal central axis (X), extending in parallel to the length (L), and centrally in relation to the width (W) of the stack, and for the at least one, preferably both, of the first and the second connector, the pattern formed by the first and the second connector structures may he asymmetrical with respect to the longitudinal central axis (X).

Patterns which are asymmetrical with respect to the longitudinal central axis, may be designed so as to provide interconnections independently of the relative orientation of the end surfaces.

The first and second end surfaces may each define a transversal central axis (Y), extending in parallel to the width (W), and centrally in relation to the length (L) of the stack, and for the at least one, preferably both, of first and the second connector, the pattern formed by the first and the second connector structures is asymmetrical with respect to the transversal central axis (Y).

Patterns which are asymmetrical with respect to the transversal central axis, may be designed so as provide interconnections independently of the relative orientation of the end surfaces. For example the interconnection may be made independently of which two, out of the total four, end surfaces of the two stacks that are to be interconnected, hence rendering the interconnection less dependent on the orientation of the stacks.

The pattern formed by the first and the second connector structures may be such that at least a portion of the first structure on one side of the longitudinal central axis (X), mirrors a portion of the second structure on the other side of the longitudinal central axis (X), preferably all portions of the first structure on one side of the longitudinal central axis mirrors a portion of the second structure on the oilier side of the longitudinal central axis.

With connectors comprising mirroring first and second structures over the longitudinal central axis may, interconnectivity between two similar connectors, regardless of their relative orientation may be achieved.

The pattern formed by the first and the second connector structures may be such that at least a portion of the first structure on one side of the transverse central axis (Y), mirrors a portion of the second structure on the other side of the transverse central axis (Y), preferably all portions of the first structure on one side of the transversal central axis (Y) mirrors a portion of the second structure on the other side of the transversal central axis (Y).

With connectors comprising mirroring first and second structures as seen over the transversal central axis, two similar connectors may be interconnected regardless of their orientation in relation to the transverse central axis.

In particular, at least one portion of the first structure, located on one side of the longitudinal central axis (X) and on one side of the transversal central axis (Y); may mirror a portion of the second structure on the other side of the longitudinal central axis (X) and a portion of the second structure on the other side of the transversal central axis (Y).

A connector where at least one portion of the first structure mirrors a portion of the second structure over the longitudinal central axis (X); and a portion of the second structure over the transversal axis (Y), may be connected to another, identical connector, regardless of the relative orientation of the connectors. Hence, a stack comprising such first and second connectors may be interconnected to another, identical stack, without concern to the relative orientation of the two ends of the stacks.

It may be that only one out of the first and the second connector structures is located on one side of the longitudinal central axis (X). This will be sufficient e.g. for forming e.g. a mirroring pattern as described in the above.

As mentioned in the above, the first and the second connectors may be identical. In this case, a plurality of identical stacks may be provided, the stacks being interconnectable in a controlled manner.

Each one of the first and second connectors may be positioned in the same manner at the first and second end surfaces of the stack.

Each one of the first and second connectors may be centrally arranged in view of at least one, preferably both of the length (L) and width (W) of the respective end surface.

Where the first and second connectors are centrally arranged in view of one or both of the length and width (i.e. centrally arranged in view of the longitudinal axis and the transversal axis), it may be ensured that the connectors will meet when the two end surfaces of two stacks are brought together. In this case, any asymmetry in the pattern of the connector structures in view of the axis wilt be accomplished, by the pattern being asymmetrically arranged on the connector. This may be preferred from a manufacturing point of view.

Alternatively, the first and/or second connector may be asymmetrically arranged in view of on(r) or both of the length and width axis. In this case, any asymmetry in the pattern of the connector structures in view of the axis may be at least partially accomplished by the asymmetrical arrangement of the connector.

One of the first and the second connector structures may comprise hooks, and the other of the first and the second connector structures may comprise loops. Hook and loop materials providing sufficient strength and suppleness for the application intended herein are commercially available, e.g. under the trademark Velcro®.

The first connector and the second connector may each have a height of less than 2 mm, preferably less than 1 mm, most preferred less than 0.6 mm. Low heights of the connectors may facilitate passage of the interconnected connectors of a continuous web through a designated dispenser.

In the first and/or the second connector, the first connector structure may be provided by a first connector material, and the other connector structure may he provided by a second connector material.

For example, the first connector structure may be a loop material, and the second connector structure may be a hook material.

The connectors may be directly or indirectly attached to the end surfaces of the stack. For example, the connectors may be adhesively attached to the end surfaces of the stack. In this case, the connector material may foe glued to the stack during production thereof, or the connector material may be provided as a sticker material being attached to the stack.

In the first and/or the second connector, the first connector material may be attached to the second connector material, and the second connector material may be attached to the respective end surface of the stack. In this case, the first connecter materiel will be indirectly attached to the stack. The second connector material may be directly or indirectly attached to the stack.

The first and/or second connector may comprise a carrier material onto which the first and/or second connector material is attached, the carrier material being attached to the respective end surface of the stack. In this case, both connector materials will be indirectly attached to the stack via the carrier. The carrier material may be directly or indirectly attached to the stack.

In the first, and/or second connector, the first connector structure and the second connector structure may be provided by a single continuous connector material.

Such a continuous connector material will hence be provided with both first and second connector structures. The continuous connector material could he a material where the first and second structures are randomly arranged, as mentioned in the above. The continuous connector material could also be a material where the first and second structures are arranged in a selected pattern.

The first connector material, the second connector material, the carrier material, or the single continuous connector material, respectively, may be band-shaped. Such a band-shaped material may be arranged over the full length (L) of the stack. Provision of the connector materials as band-shaped materials may be advantageous in view of manufacturing. Such band-shaped materials could in some alternatives be arranged over the full length of the stack.

The continuous web material may he provided with weakening lines, preferably perforation lines, dividing the web material into individual sheets.

It has been realised, that with mechanical connectors, relatively small areas of interconnected connector structures are needed to provide sufficient connection strength. The shear force between the first connector and the second connector, when interconnected, reflects the strength of the interconnection, when the web of the interconnected stacks is pulled such as when the interconnected web is drawn through a designated dispenser. To ensure the proper feeding of the interconnected web, the shear force may be greater than the force required to pull a product of the web from the dispenser.

Moreover, if the web is provided with weakening lines, dividing the web into individual sheets, it is advantageous if the interconnection between the connectors is stronger than the force required to rupture the web along the weakening lines. Accordingly, it is ensured that the web breaks at the weakening lines rather than at the interconnection between the connectors.

The stack may comprise a first continuous web material divided into individual sheets by means of weakening lines, and a second web material divided into individual sheets by means of weakening lines, the first and second webs being interfolded with one another so as to form the stack, and the first and the second webs may be arranged such that the weakening lines of the first web and the weakening lines of the second web are offset with respect to each oilier along the webs.

The attachment of the connector to the stack may simultaneously accomplish interconnection of the first and second webs at the connector.

Moreover, there is provided a package comprising a stack in accordance with the above, and a wrapper extending at least over the height direction (H), so as to maintain the integrity of the stack during transport and storage thereof.

The wrapper may be configured to be completely removable from the stack. Hence, the connectors should be displayed when the wrapper is removed from the stack.

Moreover, there is provided a master package comprising a plurality of stacks in accordance with the above, preferably comprising more than 3, most preferred comprising more than 5 stacks.

In such a master package, the first and second connectors of said plurality of stacks may be adapted such that the average likelihood of two stacks, when randomly selected from said plurality of stacks and randomly oriented with a connector from one stack meeting a connector of another stack, becoming interconnected, is greater than 75%, preferably greater than 90%, most preferred substantially 100%.

With "average likelihood" is meant the likelihood achieved when considering all of the packages of said master package.

At least some of the first and second connectors of said stacks comprised in the package may be different.

In certain variants, preferably all of said first and second connecters are different. In this case, the first and second connection structures may be arranged to form patterns displaying random variations over the connectors.

Alternatively, the first and second connection structures may be arranged to form patterns displaying ordered variations over the connectors.

At least some of the first and second connectors of said stacks composed in the package may be identical.

In certain variants, all of the first and second connectors of the plurality of stacks may be identical.

Also, there is provided a compound stack comprising a plurality of stacks in accordance with the above, the stacks being interconnected via their respective first and second connectors.

Also, there is provided the use of a stack in accordance with the above in a dispenser including a housing having a storage space for the stack.

Also, there is provided a dispenser comprising a housing having a storage space including a stack in accordance with the above, preferably the storage space being arranged in the dispenser such that web material is fed from an upper end surface of the stack, as seen in a vertical direction.

Also, there is provided a dispenser as described in the above, comprising a compound stack as described in the above.

Also, there is provided a method for loading stacks in a dispenser including a housing having a storage space for storing at least two stacks, the storage space comprising at least a portion of an initial stack, comprising: providing a stack in accordance with the above, positioning the stack at least partly inside the storage space, and interconnecting the stack with the initial stack, via the first or second connector.

BRIEF DESCRIPTION OF THE DRAWINGS

The present disclosure will now be further described using exemplary embodiments as depicted in the enclosed drawings wherein:

FIGS. 3a and 3b illustrate various embodiments of first and/or second connectors;

FIGS. 5a to 5d illustrate various embodiments of first and/or second connectors;

Like reference numbers denote like features in FIGS. 1-8. In FIG. 9 however, other reference numbers are used.

DETAILED DESCRIPTION OF PREFERRED EMBODIMENTS

Figure 1:
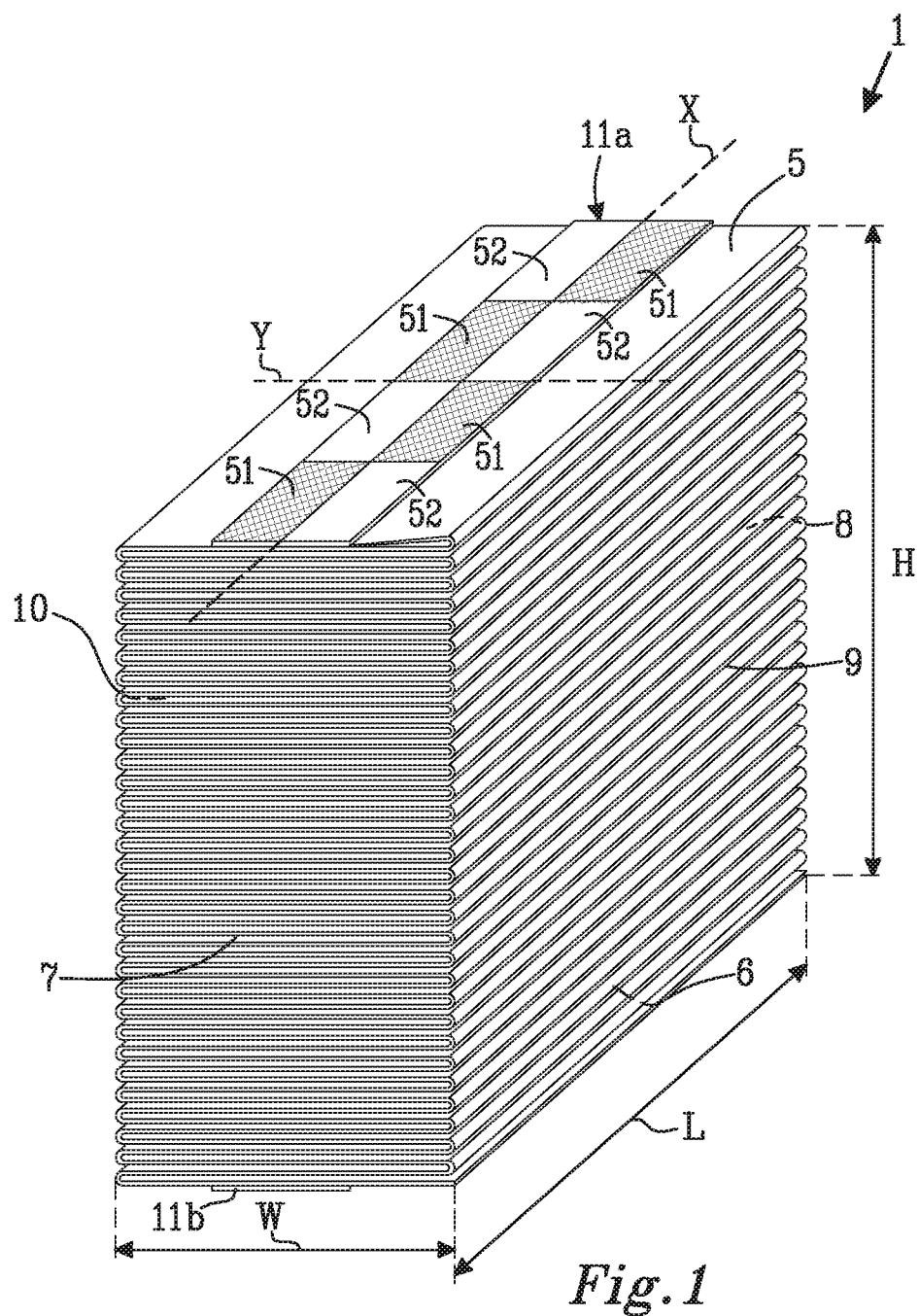
FIGS. 1 and 2 illustrate an embodiment of a stack of web material comprising first and second connectors.
Figure 2:
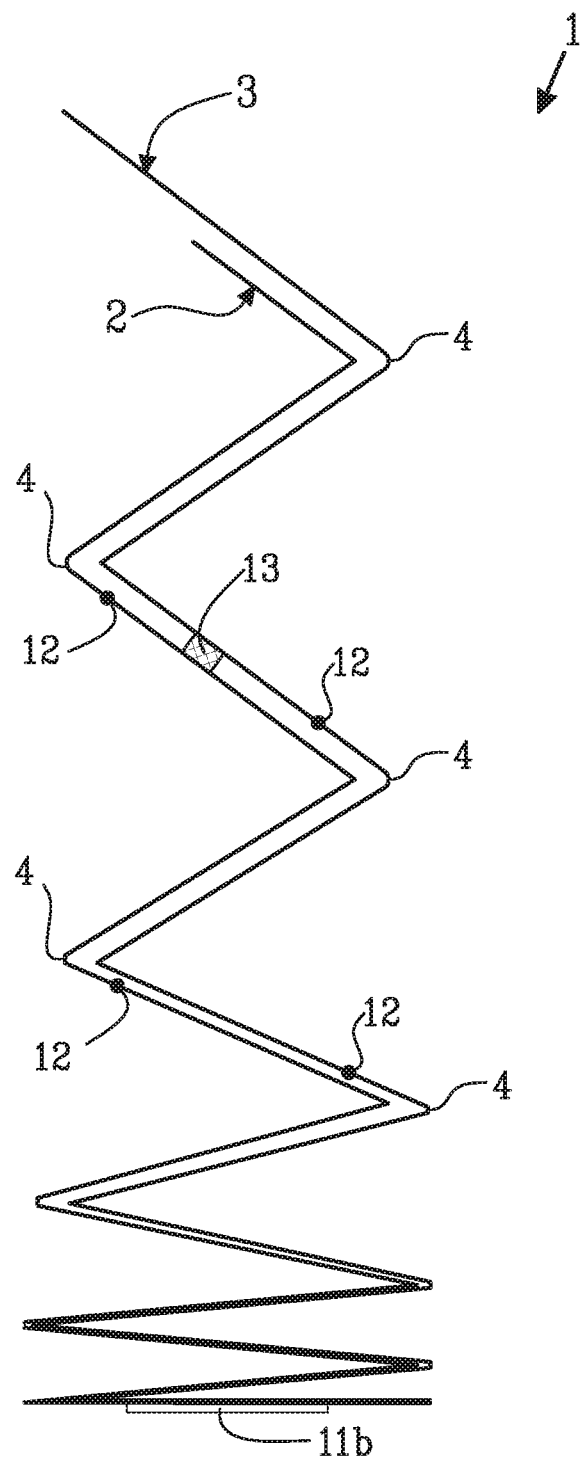

FIGS. 1 and 2 illustrate an embodiment of a stack 1 of web material for hygiene products, for use in a dispenser. The stack 1 comprises at least one continuous web material 2, 3 being Z-folded about transverse folding lines, thereby providing panels having a length L along said folding lines, and a width W perpendicular to said folding lines. The panels are piled on top of each other to form a stack, having a height H.

Accordingly, said stack outlines a rectangular parallelepiped having said length L, width W and height H. The parallelepiped will have six outer surfaces:
- a top surface 5 and a bottom surface 6, both being parallel to the panels of said stack 1.
- two side surfaces 7, 8, which are generally formed by the longitudinal edges of the Z-folded web material.
- a front surface 9 and a back surface 10, which are generally formed by the folded edges of the Z-folded web material.

As explained in the above, with "continuous web material" is meant a material which may be continuously fed for example when arranged in an appropriate dispenser. Preferred web materials are in particular such that are suitable for forming absorbent tissues for personal use, e.g. for wiping the hands of a user after wash, for napkins, or for object wiping purposes.

The term "web material" is herein to be understood to include tissue paper materials, nonwoven materials, and materials being a mixture of tissue paper and nonwoven materials.

The term "tissue paper" is herein to be understood as a soft absorbent paper having a basis weight below 65 g/m2, and typically between 10 and 50 g/m2. Its density is typically below 0.60 g/cm3, preferably below 0.30 g/cm3 and more preferably between 0.08 and 0.20 g/cm3. The tissue paper may be creped or non-creped. The creping may take place in wet or dry condition. The tissue paper may be made by TAD or atmos-methods. The fibres contained in the tissue paper are mainly pulp fibres from chemical pulp, mechanical pulp, thermo mechanical pulp, chemo mechanical pulp and/or chemo thermo mechanical pulp (CTMP). The tissue paper may also contain other types of fibres enhancing e.g. strength, absorption or softness of the paper. These fibres may be made from regenerated cellulose or synthetic material such as polyolefins, polyesters, polyamides etc.

The term "nonwoven" is applied to a wide range of products which in term of their properties are located between the groups of paper and cardboard on the one hand and textiles on the other hand. As regards nonwovens a large number of extremely varied production processes are used, such as airlaid, wetlaid, spunlaced, spunbond, meltblown techniques etc. The fibres may be in the form of endless fibres or fibres prefabricated with an endless length, as synthetic fibres produced in situ or in the form of staple fibres. Alternatively, they may be made from natural fibres or from blends of synthetic fibres and natural fibres.

The web material may be recycled flexible material newly-produced material or a combination thereof. Similar stacks as the one described in FIG. 1 may be provided comprising one single continuous web material, or several interfolded continuous web materials.

When the web material is continuous, the continuous web material may be integral, such that it may be torn or cut into individual products at selected locations, e.g. in a dispenser. Alternatively, the web material may comprise weakening lines, along which the web is intended to be severed for formation of individual products.

In FIG. 2 an embodiment is illustrated, where the stack comprises two webs 2, 3 of material, which are interfolded. In this embodiment, the first and the second web materials 2, 3, are each divided into individual sheets by lines of weakness 12. Moreover, the first and the second webs 2, 3 are arranged such that the lines of weakness of the first web and the lines of weakness of the second web are offset with respect to each other along the webs.

A stack 1 in accordance with this embodiment has the advantage that the webs 2, 3 may be automatically fed in a dispenser, requiring only the force from a user pulling one of the webs 2 to accomplish automatic feeding of the other web 3.

Advantageously the weakening lines may be perforation lines. The geometry of the perforations may be selected to provide suitable strength in accordance with the web material and the dispenser to be used.

The perforation lines may be formed by alternating bonds and slots. It has been found that a remaining bonded length, being the total bond length/(total bond length+total slot length) is between 4% and 50%, preferably between 4% and 25%, most preferred between 4% and 15%, is suitable for many relevant applications. The total bond 5 length/(total bond length+total slot length) may be used as an indication of the strength of the perforation line. It is desired to form perforation lines which are strong enough to enable feeding of the web material from the stack in a suitable dispenser, but which are also weak enough to enable separation of the sheets. In this context, it is known that other parameters will also influence the strength of the perforation line, such as the web quality, and the size, shape and distribution of the slots and tabs. The above-mentioned measure may therefore be useful for guiding the person skilled in the art when selecting suitable perforation lines.

In the embodiment illustrated in FIG. 2, the weakening lines 12 of each one of the webs 2, 3, always appear at the same distance from the folded edges 4 of the stack 1. Accordingly, the distance between two consecutive weakening lines 12 is evenly divisible with the distance between two consecutive folding lines 4 (=the width W of the stack 1). In other words: (the distance between two consecutive weakening lines 12)/(the distance between two consecutive folding lines 4)=an integer greater than zero.

Alternatively, the distance between two consecutive weakening lines 12 could be selected so as not to be evenly divisible with the distance between two consecutive folding lines 4. In this case, the weakening lines 12 will appear at various distances from the folding lines 4, as seen from the side surfaces 7, 8 of the stack 1. This might be preferred, since such a stack 1 may avoid experiencing problems due to irregularities in the panels originating from the presence of the weakening lines 12, and being multiplied over the height of the stack. In particular, such problems may become pronounced for stacks 1 having relatively great heights and/or including a relatively large number of panels. By securing that the weakening lines 12 will become distributed over the width of the stack 1, any irregularities are also distributed, and the stability of the stack 1 may be improved.

Moreover, the distance between consecutive weakening lines 12 being other than evenly divisible with the width W of the stack 1 enables the length of the products to be selected freely, without limitations involving considerations of the width W of the stack. The width W of the stack 1, as well as the length L must usually be selected in accordance with the size of a storage space in a housing of a dispenser from which the web material 2,3 is to dispensed.

In this context, it has also been found to be advantageous if the weakening lines 12 are distributed along the web such that essentially no weakening line 12 will coincide with a folding line 4 in the stack. This is because a weakening line, in particular a perforation line, being simultaneously a folding line might give rise to a crease in the web material which is not smoothed out as much as other folding lines when the web Is unfolded to be fed through a dispenser. Hence, such a crease could give rise to unwanted irregularities when feeding the web material. In particular when two or more webs are used, such a crease in one web might result in that web becoming asynchronised with the other web (s).

The above descriptions regarding the weakening lines are equally applicable to stacks 1 including one single, two, or more continuous material webs.

Moreover, in the embodiment of FIG. 2, the first web material 2 and the second web material 3 are joined to each other at a plurality of joints 13 along said webs 2,3. Preferably, said joints 13 are regularly distributed along the webs 2,3. Joints 13 between 20 the first and the second web 2,3 serve the purpose of hindering the webs from becoming asynchronous during feeding of the webs in a dispenser.

This may be of particular importance where stacks are used including relatively long web lengths, that is for stacks having a relatively great height and/or including a relatively large number of panels. Where long web lengths run uninterrupted, there might be an increased risk that the two webs 2, 3 in a stack 1 become asynchronised during feeding thereof from the stack. This is particularly the case when the web is fed from the top of the stack, as seen when the stack is arranged in the dispenser. With appropriately distributed joints between the two webs, any such risks may be avoided or diminished.

The joints 13 could connect the material surfaces, i.e. the panel surfaces, of the webs 2, 3 to each other, or they could connect the longitudinal edges of the webs to each other. The joints 13 could be distributed in different numbers, sizes and patterns. Preferably, the joints 13 could be in the form of adhesive.

A stack may advantageously comprise at least 160, preferably at least 200, most preferred at least 250 individual products.

A stack may be intended to completely fill a storage space of a designated dispenser. However, for larger dispensers, the stack may be intended for connection to other stacks to form a compound stack filling the storage space of a larger dispenser.

To this end, the stack 1 illustrated in FIG. 1 comprises a first connector 11a arranged on the top surface 5 of the stack, and a second connector 11b arranged on the bottom surface 6 of the stack.

The connectors 11a and 11b are mechanical connectors. Mechanical connectors have the advantage of providing a secure connection between themselves, whilst not being prone to unwanted connection to other materials, such as to the material wed itself. Hence, use of mechanical connectors facilitates the general handling of the stacks.

The connectors are to be connectors for mechanically interconnecting the end surfaces of the stacks to other, similar stacks, as is required when the stacks are to be used in a dispenser having a large storage space housing several stacks.

Preferred mechanical connectors may be openable and reclosable, which provides the possibility of correcting the position of the stack, if an attendant has unintentionally performed an unsuitable first interconnection between two stacks.

In many dispensers, particularly of the larger kind, the web material is to be run along a web path and through a number of devices before being fed to a user. Such devices could include various rollers, cutters, perforation cutters, and the like. Mechanical connectors may be designed such that they may pass these various devices without hindering the web, and without leaving residues on the devices themselves.

For example, the first and second connectors may be of the hook and loop type.

In the stack of FIG. 1, the first and second connectors 11a and 11b each comprises a first mechanical connector structure 51 and a second mechanical connector structure 52. The first and second mechanical connector structures 51, 52 are two corresponding structures, each structure being capable of forming a mechanical interconnection with the other structure, and being incapable of forming a mechanical interconnection with an identical structure. For example, the first connection structure may be a hook connector structure, and the second connection structure may be a loop connector structure.

Accordingly, the first and second connectors 11a, 11b are mechanically connectable to another connector of another stack of web material, provided said another connector comprises at least one of the first and/or second mechanical connector structure, and provided the location of the corresponding connector structures on the respective end surfaces, and the relative orientation thereof, are such that the corresponding connector structures may meet to form an interconnection.

In the embodiment of FIG. 1, it is envisaged that the first and second connectors 11a, 11b both comprise the first mechanical connector structure 51 and the second mechanical connector structure 52.

However, other embodiments are conceivable, wherein only one out of the two connectors 11a, 11b comprises the first and the second connector structure 51, 52, and the other connector 11a, 11b comprises only one out of of the first and the second connector structures 51, 52.

In certain variants, the first and second connector structures 51, 52 may arranged to form a pattern over said end surfaces 5, 6. The embodiments described in FIGS. 3a-3b, 4a-4b, 5a-5c are all embodiments where the first and second connector structures 51, 52 are arranged so as to form organised patterns.

In certain variants, the pattern may be adapted such that each one of the first and second end surfaces 5, 6 is mechanically connectable to each one of the first and the second end surfaces 5, 6 of another, identical stack 1. At least the variants described in FIGS. 3a-3b and 4a-4b are adapted to such use. It will be noted, that for being mechanically connectable to each one out of the first and second end surfaces of another, identical stack, there may still be requirements as to the orientation of the end surfaces, in order to achieve such a connection.

In certain variants, the pattern may be adapted such that each one of the first and second end surfaces 5, 6 is mechanically connectable to each one of the first and second end surfaces of another, identical stack 1, regardless of how the respective end surfaces are oriented in relation to each other. In other words, the connecting system is fool-proof in that all conceivable combinations when trying to set two identical stacks together, will be successful. FIGS. 3a-3b illustrate a such a variant of connectors.

In FIGS. 3a-3b, FIGS. 4a-4b, and FIGS. 5a-5b, various connectors are illustrated with reference to a longitudinal axis X and a transversal axis Y. It is to be noted, that although the figures illustrate the connector only, the axes are indeed defined by the first and second end surfaces 5,6 of the respective stacks.

Hence, the first and second end surfaces 5,6 each define a longitudinal central axis X extending in parallel to the length L of the stack, and centrally in relation to the width W of the stack. Similarly, the first and second end surfaces 5,6 each define a longitudinal transverse axis Y extending in parallel to the width W of the stack, and centrally in relation to the length L of the stack.

FIG. 3a illustrates a variant of a connector 11a where the pattern formed by the first and the second connector structures 51, 52 is asymmetrical with respect to said longitudinal central axis X, and with respect to the transversal central axis Y.

Moreover, the pattern formed by the first and second connector structures 51, 52 is such that each portion of the first structure 51 on one side of the longitudinal central axis X, mirrors a portion of the second structure 52 on the other side of the longitudinal central axis X. Similarly, each portion of the first structure 51 on one side of the longitudinal transversal axis Y, mirrors a portion of the second structure 52 on the other side of the transversal central axis Y.

This results in a "chess-board" patterned connector 11a as illustrated in FIG. 3a.

The arrangement with the mirroring first and second connector structures 51, 52 results in a connector which, when applied on both the first and the second end surface 5,6 of a number of stacks, results in a fool-proof interconnection of said stacks. No matter in which orientation the connectors are situated when they meet each other, each portion of the first structure 51 will always meet a portion of the second structure 52, resulting in an interconnection between said portions. Hence, the likelihood of an interconnection being created, if two such stacks are randomly put together is 100%.

FIG. 3b Illustrates another variant of a connector 11a, where the pattern formed by the first and the second connector structures 51, 52 is asymmetrical with respect to said longitudinal central axis X, and with respect to the transversal central axis Y.

In this case, on one side of the longitudinal central axis X only the second connector structures 52 appears. On the other side of the longitudinal central axis X, there is a pattern comprising portions of the first connector structure 51, and of the second connector structure 52, arranged in an alternating manner and mirroring each other as seen over the transversal axis Y.

In the illustrated arrangement, each portion of the first structure 51 on one side of the longitudinal central axis X, mirrors a portion of the second structure 52 on the other side of the longitudinal central axis X. Similarly, each portion of the first structure 51 on one side of the longitudinal transversal axis Y, mirrors a portion of the second structure 52 on the other side of the transversal central axis Y. Accordingly, also the connector illustrated in FIG. 3b results in a fool-proof interconnection between stacks provided with such connectors on both of their end surfaces 5,6. No matter in which orientation the connectors are when they meet each other, some portion of the first structure 51 will always meet a portion of the second structure 52, and result in an interconnection. Hence, toe likelihood of an interconnection being created, if two such stacks are randomly put together, is 100%.

In the embodiment illustrated in FIG. 3b, all portions of the first structure 51 will not meet a portion of the second structure 52 in all possible relative orientations of the stacks. This however not required for ensuring connection between the connectors. Accordingly, the arrangement illustrated in FIG. 3b might be perceived as a simplified variant of the arrangement of FIG. 3a.

Indeed, in order to provide at least one portion of the first structure 51, located on one side of the longitudinal central axis X and on one side of the transversal central axis Y; mirroring a portion of the second structure 52 on the other side of the longitudinal central axis X and another portion of the second structure 52 on the other side of the transversal central axis Y, so as to render the connection between two such connectors fool-proof, it would be sufficient to provide a connector similar to the one illustrated in FIG. 3b, but comprising only one single portion of the first structure 51.

Figure 4A:
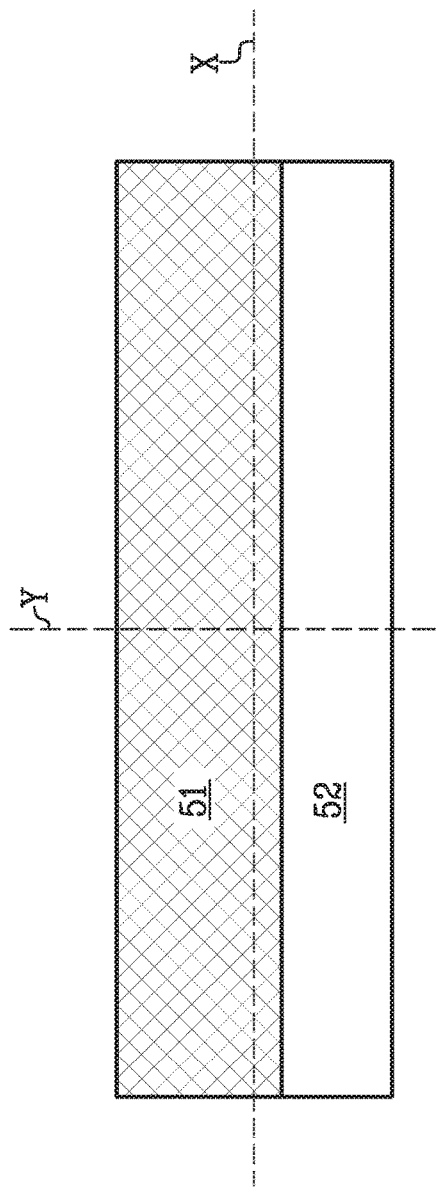
FIGS. 4a and 4b illustrate various embodiments of first and/or second connectors.

FIG. 4a illustrates an example of a connector where a first connector structure 51 and a second connector structure 52 are asymmetrically arranged with respect to the longitudinal axes X, but symmetrically arranged with respect to the transversal axes Y.

Although such arrangements will generally provide less versatility coming to the interconnection between the connectors, they may nevertheless be preferred, in particular for their ease of manufacturing.

The embodiment of a connector in FIG. 4a comprises a portion of the first connector structure 51, which extends on one side of the longitudinal axis X, and slightly over said axis X. A portion of the second connector structure 52 is hence arranged at a distance from the longitudinal axis X, and extending further away from the longitudinal axis X. The portions of the first and the second connector structure 51, 52 both extend in a band-shaped manner along the longitudinal axis X.

A connector as illustrated in FIG. 4a may be connected to an identical connector, if the two identical connectors are positioned in relation to each other such that the first connector structure 51 meets the second connector structure 52. Hence, stacks comprising identical such connectors on both end surfaces 5,6 would, if randomly oriented, display a likelihood of becoming interconnected of 50% (which is not greater than a stacks with hooks on one end surface, and loops on the other end surface.

Figure 4B:
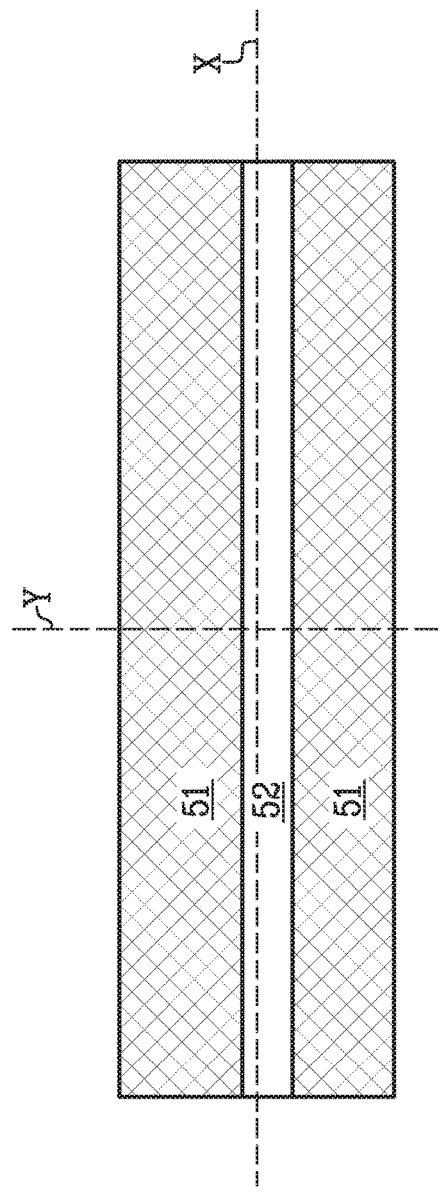

However, the embodiment of a connector in FIG. 4a may be used together with another connector, e.g. as illustrated in FIG. 4b, to facilitate interconnections of the stacks. The connector as illustrated in FIG. 4b comprises two portions of the first connector structure 51, extending along the longitudinal axis X. A portion of the second connector structure 52 is arranged in between the two portions of the first connector structure 51.

The second connector structure 52 of the connector of FIG. 4b is arranged in a staggered relationship to the second connector structure 52 of the connector in FIG. 4a. Accordingly, a connector in accordance with FIG. 4b will be connectable to a connector in accordance with FIG. 4a, regardless of how the connectors are oriented in relation to each other.

Accordingly, a number of stacks may be provided with a first connector 11a on a first end surface 5, which is in accordance with FIG. 4a, and with a second connector 11b on a second end surface 6, which is accordance with FIG. 4b. In this case, the likelihood of achieving an interconnection between two end surfaces 5,6 of two such stacks, when no concern is taken to the relative orientation of the stacks, will be 75%.

As understood by the examples of FIGS. 3a-3b, and FIGS. 4a-4b, a plurality of stacks intended for interconnection with each other via first and second connectors provided on each stack may be manufactured such that the first and second connectors of all manufactured stacks are identical. In this case, the first and second connector of each stack may also be identical, or the first and second connector of each stack may be different. Hence, regardless of which two stacks out of the plurality of identical stacks that are to be interconnected, the same number of connection possibilities will appear.

Hence, there may be provided a master package comprising a plurality of stacks, each stack comprising a first and a second connector, where the stacks are identical.

Another option is to manufacture a plurality of stacks having first and second connectors, where the appearance of the first and/or second connector may differ between the stacks. For example, the first connector of the first stack may display a first pattern, the first connector of the second stack may display a second pattern, the first connector of the third stack may display a third pattern, etc. In this case, the connection possibilities between two selected stacks might be different than the connection possibilities between two other selected stacks. Nevertheless, by selecting suitable patterns, and suitable variations between patterns, it may be ensured that a sufficient number of connection possibilities and a sufficient connection likelihood is obtained.

Hence, there may be provided a master package comprising a plurality of stacks, each stack comprising a first and a second connector, where the stacks are different.

FIGS. 5a to 5d illustrate some variants of connectors, that may be used for such embodiments. In these variants, a connector 11a is symmetrically arranged in view of the longitudinal and transversal axes X, Y. A first connector structure 51 extends over the entire area spanned by the connector 11a, apart from over a band shaped area extending along the transversal axis X, and which is occupied by a second connector structure 52. From FIGS. 5a-5d, it may be seen how the location of the band-shaped area of the second connector structure 52 varies between the variants of the figures, in that the distance between the band-shaped area of the second connector structure 52 and the transversal axis X varies. The area comprising the second connector structure 52 may be described as "wandering" over the area of the connector 11a.

Figure 5C:
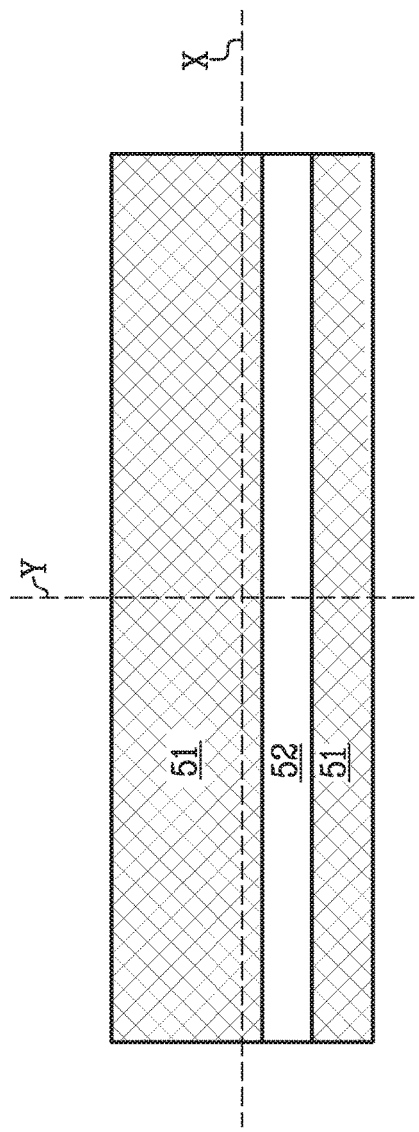
Figure 5D:
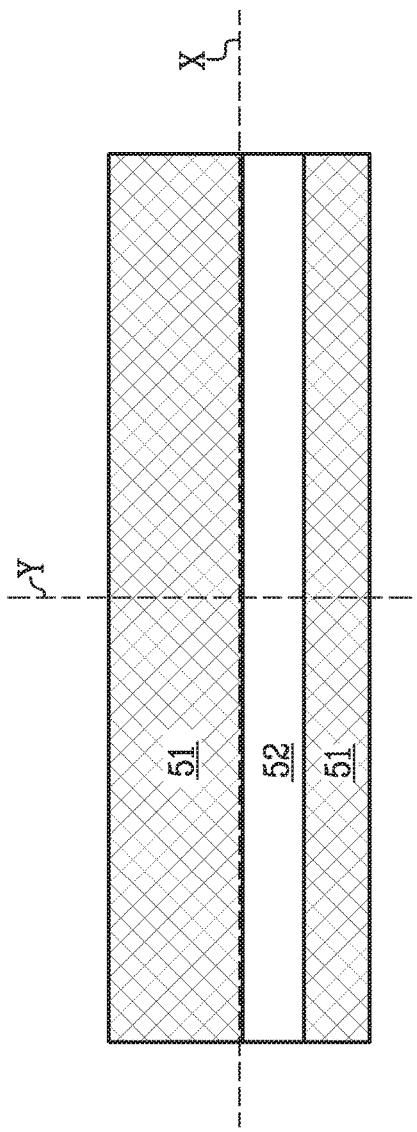

A plurality of stacks may be provided using the three variants of FIGS. 5a-5c to form the first and the second connectors. Hence, a first stack might include a first connector 11a in accordance with FIG. 5a, and a second connector 11b in accordance with FIG. 5b. Then, a second stack may be provided with a first connector 11a in accordance with FIG. 5c, and a second connector 11b in accordance with FIG. 5d.

In this case, the first and the second stack will always be connectable to each other, regardless of which connector meet, and regardless of the orientation of said connectors. However, if the first stack is to be connected to another, identical first stack, there is a risk that no connection will occur, should two identical connectors meet when identically orientated.

Optionally, a plurality of stacks may be provided using the variant of FIG. 5a for the first and the second connector of a first stack, the variant of FIG. 5b for the first and the second connector of a second stack, etc, resulting in four different stacks (FIG. 5a-5d). Hence, the first stack is interconnectable at least to the second stack, the second stack to the third stack, and the third stack to the fourth stack. The fourth stack may in turn be connectable to a new first stack.

If desired, a master package comprising a plurality of different stacks may be provided, in which the different stacks are arranged in a predetermined order, such that two stacks being withdrawn in a sequence from the master package are always, or at least with a sufficient likelihood, interconnectable regardless of the orientation of the connectors.

In the embodiments described in relation to FIGS. 5a-5d, the different patterns of the connectors are obtained varying a selected pattern in a controlled manner. Such variations may result e.g. if using a continuous connector material displaying a repeated pattern for forming the connectors, and where the pattern repetition is not evenly divisible with the selected connector length. In this case, for each connector cut from the connector material, the pattern will "wander" a distance corresponding to the mismatch between the pattern repetition length and the connector length. Accordingly, different connectors may be provided for application to a number of stacks. Still, a sufficient likelihood of connection between the stacks, even if no regard is taken to the orientation of the connectors, may be achieved when the patterns and variations are suitably selected.

Other embodiments are possible where the connectors are provided with randomly selected or varied patterns.

To provide the connectors 11a, 11b on the end surfaces 5, 6 of the stack, numerous alternatives are possible.

For example, the first connector structure 51 may be provided by a first connector material 51', and the other connector structure is provided by a second connector material 52'.

Figure 6A:
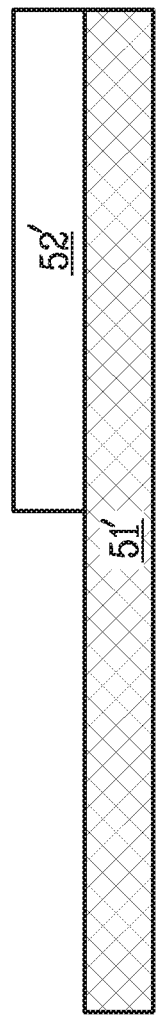
FIGS. 6a to 6c illustrate various embodiments of first and/or second connectors.
Figure 6B:
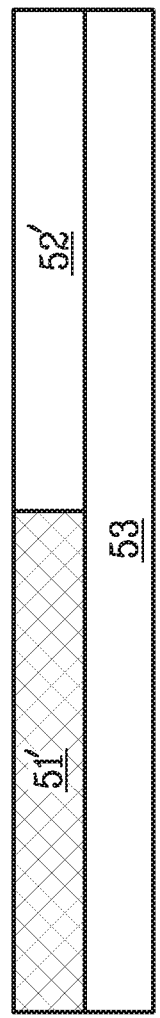
Figure 6C:
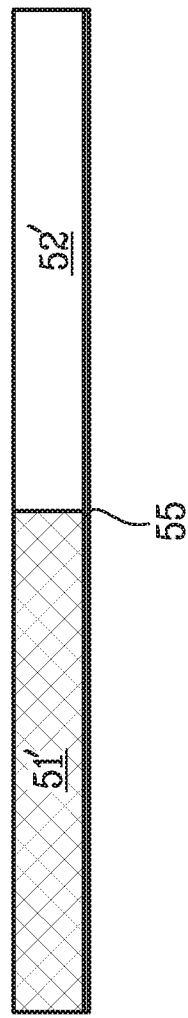

FIGS. 6a to 6c illustrate various variants of connectors, viewed in a cross-section along the axis Y.

FIG. 6a illustrates a variant wherein the second connector material 52' is attached to the fist connector material 51'. The first connector material 51' may then be attached to the respective end surface 5, 6 of the stack.

Using this variant, a variant of a connector such as the one illustrated in FIGS. 3a or 3b may be manufactured by attachment of intermittent pieces of second connector material 52' onto a continuous piece of first connector material 51'.

In another variant, a first connector material 51' may be provided as a continuous piece of material. A second connector material 52' may be provided as a piece of material in which through holes are formed. The second connector material 52' may then be applied over the first connector material 51', such that the first connector structures 51 of the first connector material 51' is accessible via the through holes in the second connector material 52'. The first connector material 51' may then be attached to the respective end surface of the stack.

For example, in accordance with the last mentioned variant, a continuous piece of second connector material 52', in which through holes are cut out, may be laminated over a continuous piece of first connector material 51 resulting in a continuous piece of of connector material comprising first mechanical connector structures 51 and second mechanical connector structures 52, which may be used to form connectors 11a, 11b. The first connector material 51' may in this case be a loop material, and the second connector material 52' may be a hook material.

In the above-mentioned example, the through holes may be cut out randomly, so as to provide different connectors displaying random variations.

Alternatively, the through holes may be cut out in a selected pattern. A connector material comprising a selected pattern may be used for forming identical connectors (e.g. if the pattern repetition is evenly divisible with the length of the connector), or different connectors (e.g. if the pattern repetition is not evenly divisible with the length of the connector).

FIG. 6b illustrates a variant wherein the connector 11a comprises a carrier material 53, onto which said first and second connector material 51', 52' is attached. The carrier material 53 is attachable to the respective and surface 5, 6 of the stack.

The variants exemplified by FIGS. 6a and 6b may be formed directly on the end 5,6 of a stack, after manufacture thereof. However, a more convenient method may be to form a continuous band-shaped connector material which is attached to the ends 5,6 of the stack.

FIG. 6c illustrates an embodiment of a connector, wherein the first connector structure 51 and the second connector structure 52 is provided by a single continuous connector material. Such a material may comprise a backing 55 from which the connectors structures 51, 52 extend.

In the examples of FIGS. 6a to 6c, the connector is illustrated as a unitary connector, forming a continuous piece of material which may be attached to the end surface 5 of the stack. Naturally, other variants of unitary connectors are conceivable.

However, a connector may also be formed by attachment of one or several separate material pieces of connector structure material intermittently arranged on the end surface of the stack. In this case, the connector may be described as an intermittent connector.

Figure 7A:
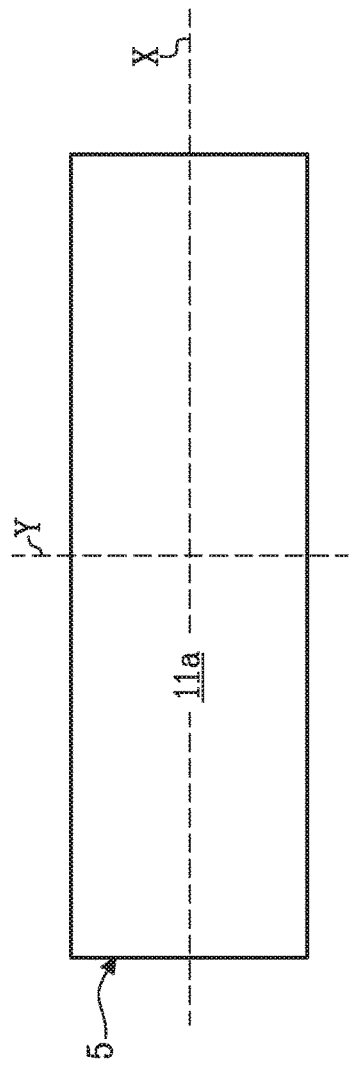
FIGS. 7a to 7c illustrate various embodiments of end surfaces comprising connectors.

As illustrated by FIG. 7a, the connector 11a may be arranged so as to extend over essentially the entire end surface 5. If the connector is a unitary connector, e.g. in accordance with the examples of FIGS. 6a to 6c, this means that the entire panel surface at end surface 5 will be covered by the connector 11a. If the connector 11a comprises several separate material pieces, the panel surface (the web material) at the end surface 5 may be visible between the separate material pieces of connector structure.

Alternatively, the connector may extend over only a portion of the length L or width W of the end surface.

Figure 7B:
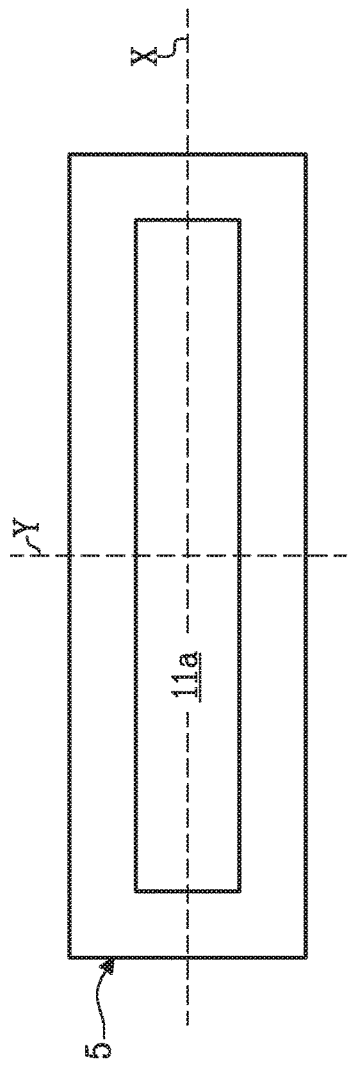

FIG. 7b illustrates an arrangement where the connector 11a extends over only a portion of the length L and over only a portion of the width W of the end surface 5. In this case, the connector 11a is centrally arranged In view of said width and length (and consequently in view of said longitudinal and transverse axis X, Y).

Figure 7C:
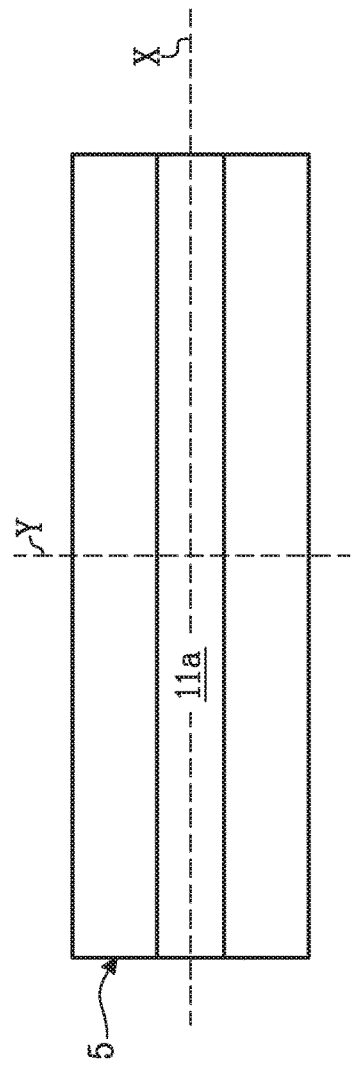

FIG. 7c illustrates an arrangement where the connector 11a extends over the entire length L, but only over a portion of the width W of the end surface 5. The connector 11a is centrally arranged in view of of said width and length (and consequently in view of said longitudinal and transverse axis X, Y).

Central arrangement of the connector on the end surface may be used to ensure that the connectors of two different stacks will meet in a controlled manner. In this case, any desired asymmetry of the first and/or second surface structure in relation to the longitudinal and/or transversal axis is obtained by the arrangement of the surface structures in relation to the connector.

However, variants are conceivable wherein any desired asymmetry of the first and/or second surface structure in relation to the longitudinal and/or transversal axis is at least partly obtained by asymmetrical arrangement of the connector on the end surface of the stack.

The attachment of the connector 11a to an end surface 5 of a stack may be performed directly or indirectly. Advantageously, the attachment may be an adhesive attachment, performed e.g. by gluing, or by the provision of the connector as an adhesive sticker.

When the stack 1 comprises at least two webs 2, 3, e.g. as depicted in FIG. 2, the attachment of said connector 11 to the stack 1 may simultaneously accomplish interconnection of the first and second webs 2,3 at said connector 11.

Alternatively, the two webs 2,3 could be interconnected adjacent said connector 11 such that both webs 2,3 of the stack will be fed when the web of the other, interconnected stack 1 is pulled, interconnection of the first and second webs 2,3 at the connector 11 may be accomplished in many different manners.

The first connector 11a and second connector 11b, may each have a height of less than 2 mm, preferably less than 1 mm, most preferred 0.8 mm. The height is to include the entire connector, including e.g. backing materials etc.

The shear force between the first connector and the second connector, when interconnected, reflects the strength of the interconnection. The first and second connectors should be selected such that, when connected, the interconnection is able to resist the forces involved when the web of the interconnected stacks is pulled, such as when the interconnected web is drawn through a designated dispenser.

Moreover, if the web is provided with weakening lines, dividing the web into individual sheets, it is preferred that the interconnection between the first and second connectors is stronger than the force required to rupture the web along the weakening lines. Accordingly, it is ensured that the web breaks at the weakening lines rather than at the interconnection between the connectors.

It is understood, that, the various examples of stacks including connectors may be combined with each other and/or with features described in relation to any one of the examples.

Figure 8:
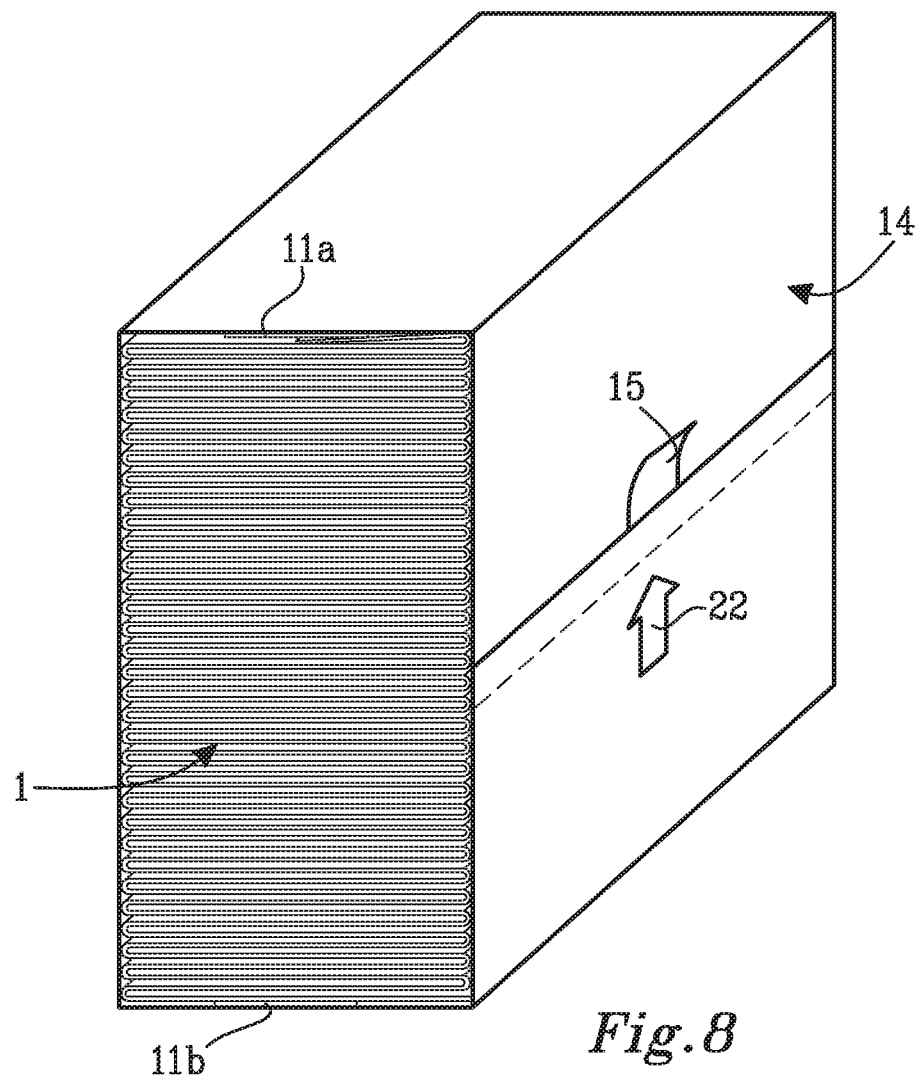
FIG. 8 illustrates an embodiment of a package including a wrapper and the stack of FIG. 1.

FIG. 8 illustrates an example of a stack as described in relation to FIG. 1 being provided in a package for maintaining the integrity of the stack during transport and storage thereof. The package comprises a wrapper extending over the height H of the stack, so as to maintain the integrity of the stack during transport and storage thereof.

The term "wrapper" is to include various types of packages which may have different shapes, be made out of different materials etc. Many types of wrappers are known in the art. The wrapper may be made by polymer materials or starch based materials. If desired, the wrapper may be made by recyclable material. It is preferred that the wrapper is configured to be removable from the integrity of the stack.

As in the package illustrated in FIG. 8, the wrapper may foe encircling said stack. A wrapper encircling the stack may provide sufficient stability and protection for being the only packaging part of the complete package. In other words, the package may consist of the stack and the wrapper. In FIG. 8, the wrapper 14 extends over the bottom 5 and top 6 surfaces, and the front 9 and back 10 surfaces of the stack. This is believed to provide good stability to the package, and may moreover be suitable from a manufacturing point of view.

In FIG. 8, the wrapper 14 extends over the complete bottom, top, front and back 5, 6, 9, 10 surfaces of the stack 1. The end surfaces 7, 8 are not covered by the wrapper 14. In other variants, the wrapper may be narrower, and extend only over a portion of the bottom, top, front and back surfaces 5, 6, 9, 10 of 20 the stack 1.

The wrapper may comprise an opening feature, in this case including a gripper 15. Hence, the package may be opened by pulling the gripper 15 such that the wrapper 14 opens and may be removed from the stack. To this end, a one hand grip and pull is all that is necessary to remove the wrapper from the stack.

The wrapper may be manually removed from the stack before introduction thereof into a storage space of a dispenser.

With certain dispensers, the wrapper might optionally be removed from the stack, when the stack is already present in a storage space of the dispenser.

If desired, the wrapper may be provided with a visual indicia indicating a feeding direction for correct feeding of the package into a designated dispenser. Such an indicia may be useful in particular when the stack and its connectors are adapted so as to provide a higher likelihood of interconnection between a plurality of such stacks, when the plurality of stacks are all positioned along a specific feeding direction.

However, when the connectors are selected so as to provide 100% likelihood of interconnection between stacks, regardless of the orientation of the stacks, the wrapper may be free from visual indicia indicating such feeding directions.

The stacks proposed herein are particularly useful for dispensers having a storage space being designed to store more than one stack. That is for dispensers intended to hold relatively large volumes of material.

In a dispenser, the web material may be contained in a storage space, from which the material is drawn via a web path to a dispensing outlet of the dispenser. Advantageously, the storage space and path are arranged such that the web material is fed from the top of the stack contained in the storage space.

For initial set-up of such a dispenser, a leading end of a first stack of web material must usually be threaded through the dispenser, along the web path, and to the dispensing outlet. After initial threading, the web material may be drawn from the dispenser. It is desired to replenish the dispenser with additional web material before the dispenser is completely empty. This is because the replenishment may then be made by interconnecting new web material to the web material remaining in the storage space. Hence, re-threading of the dispenser may be avoided.

Figure 9:
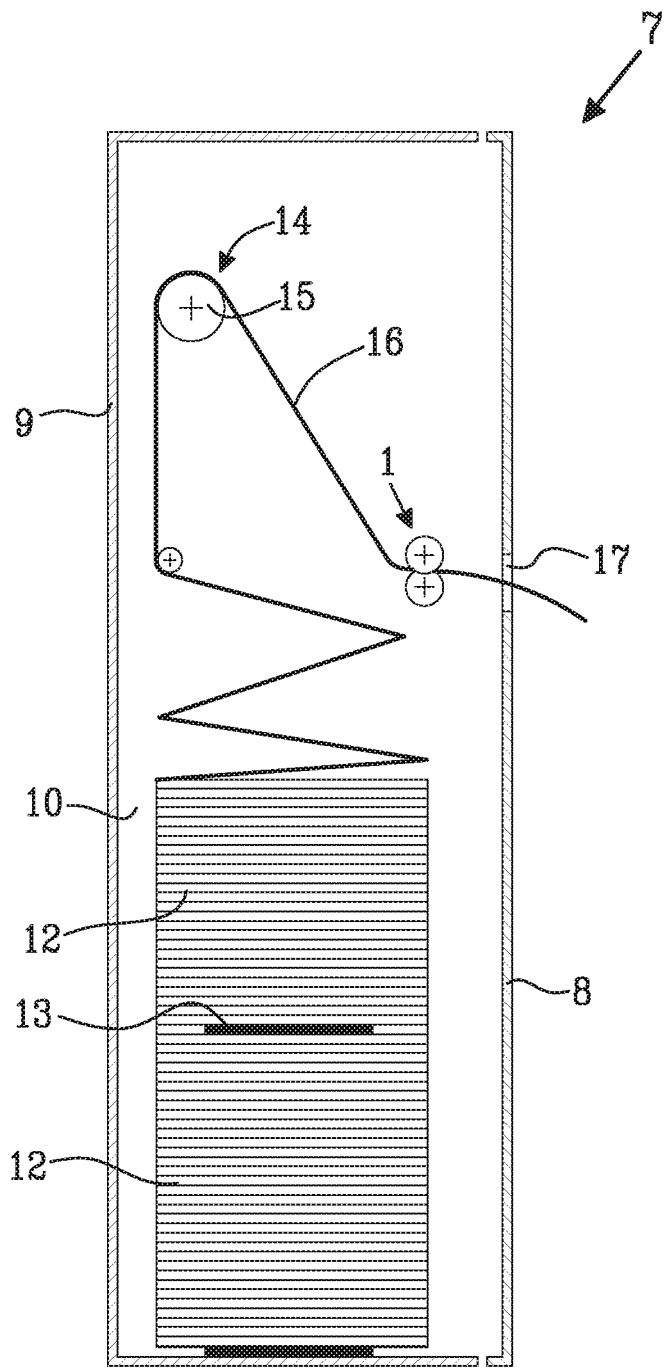
FIG. 9 illustrates an embodiment of a dispenser.

FIG. 9 schematically shows an example of a dispenser 7 comprising a storage space for storage of web material in accordance with what is described above. The dispenser 7 has an outer front wall 8, two outer side walls 9 and a housing 10. The housing 10 is intended for holding a compound stack of a continuous length of accordion-like folded web of towels of tissue paper or nonwoven comprising stacks 12 of a continuous length of accordion-like folded web of towels of tissue paper or nonwoven.

The stacks 12 comprise interconnections 13 between the stacks 12, which interconnections 13 may be formed by two interconnected connectors as described in the above.

The dispenser 7 comprises a guiding unit 14 which comprises a web-supporting roller surface 15. The at lest one web 16 is arranged to be fed over the web-supporting roller surface 15 when the dispenser 7 is in use.

The unit subsequent to the guiding element 14 is a separation unit 1. The separation unit 1 allows the web material 16 to be separated at a desired position.

The dispenser 7 illustrated in FIG. 9 comprises a compound stack of interfolded webs 16, whereby the dispenser 7 is configured so that a preceding stack of interfolded webs in the housing 10 has to be lifted to position a new, succeeding stack in the housing 10, underneath the preceding stack, to refill the dispenser 7. Stacks of interfolded webs in the dispenser 7 may be interconnected via interconnection 13, formed by the connectors of the stacks. The web 16 is arranged to be fed upwards within the housing 10, around the roller 15 located at the top of the dispenser 7 and downwards towards the separation unit 1 and to the dispensing opening 17.

In view of the above disclosure explaining how to provide connectors for achieving different likelihoods of interconnection between stacks when randomly oriented, it will be understood that master packages may be form comprising a plurality of such stacks, intended to be interconnected via their respective connectors.

By selecting suitable connectors, master packages may be achieved comprising a plurality stacks wherein the average likelihood of two randomly selected stacks, positioned in a random orientation with one connector from each stack meeting one connector from the other stack, becoming connected is greater than 50%.

Preferably, the average likelihood may be greater than 75%, or even greater than 90%. Most preferred, the average likelihood may be substantially 100%, in which case interconnection of ant two stacks out of the plurality of stacks is ensured, regardless of which stacks are selected, and regardless of their relative orientation (as long as their respective connectors do meet.)

In view of the above disclosure, many alternative variants of stacks which arrangements are conceivable, which may be useful to reduce the time and/or effort required by an attendant to perform the refill of a dispenser, including the interconnection of stacks.

Different patterns formed by the first and second connector structures in order to provide suitable connectors may be designed, and such patterns may be combined in different manners. Although several of the patterns given in the illustrated examples display continuous rectangular areas comprising the first or the second connector structures, patterns may naturally be formed by other intermittent or continuous areas, having any desired shape, e.g. circular.

The invention claimed is:

1. A stack of web material for hygiene products, for use in a dispenser, comprising
   at least one continuous web material being Z-folded about transverse folding lines, thereby providing panels having a length (L) and a width (W),
   said panels being piled on top of each other to form a height (H) of said stack extending between a first end surface and a second end surface of said stack, and said first end surface being provided with a first connector, and said second end surface being provided with a second connector,
   wherein at least one of said first and second connectors comprises
      a first area consisting of first mechanical connector structures,
      a second area consisting of second mechanical connector structures, and
      a third area consisting of second mechanical connector structures, said first and second mechanical connector structures being two corresponding structures, each structure being capable of forming a mechanical interconnection with said other structure, and being incapable of forming a mechanical interconnection with an identical structure, whereby said at least one of said first and second connectors is mechanically connectable to another connector of another stack of web material, said another connector comprising said area consisting of first and/or second mechanical connector structures,
   wherein said first and second end surfaces each define a longitudinal central axis (X), extending in parallel to said length (L), and centrally in relation to said width (W) of said stack,
   wherein said first and second end surfaces each define a transversal central axis (Y), extending in parallel to said width (W), and centrally in relation to said length (L) of said stack,
   wherein said first area is located on a first side of said longitudinal central axis (X) and on a first side of said transversal central axis (Y),
   wherein said second area is located on a second side of said longitudinal central axis (X), and on said first side of said transversal central axis (Y), and wherein said third area is located on a second side of said transversal central axis (Y), and on said first side of said longitudinal central axis (X).

2. A stack in accordance with claim 1, wherein each one of said first and second connectors comprises said first area, said second area, and said third area.

3. A stack in accordance with claim 1, wherein the first and second connectors are different.

4. A stack in accordance with claim 1, wherein the first and second connectors are identical.

5. A stack in accordance with claim 1, wherein said first and second connectors are identical.

6. A stack in accordance with claim 1, wherein said first area and said second area are arranged to form a pattern over at least one of said first and second connectors.

7. A stack in accordance with claim 6, wherein said pattern is adapted such that said at least one of said first and second connectors is mechanically connectable to an identical connector of another stack of web material.

8. A stack in accordance with claim 6, wherein
for said at least one of said first and said second connector, said pattern is asymmetrical with respect to said longitudinal central axis (X).

9. A stack in accordance with claim 6, wherein
for said at least one of said first and said second connector, said pattern is asymmetrical with respect to said transversal central axis (Y).

10. A stack in accordance with claim 6, wherein said pattern is such that at least a portion of said first structure on one side of said longitudinal central axis (X), mirrors a portion of said second structure on said other side of said longitudinal central axis (X).

11. A stack in accordance with claim 6, wherein said pattern is such that at least a portion of said first structure on one side of said transverse central axis (Y), mirrors a portion of said second structure on said other side of said transverse central axis (Y).

12. A stack according to claim 1, wherein each one of said first and second connectors is centrally arranged in view of at least one of said length (L) and width (W) of the respective end surface.

13. A stack in accordance with claim 1, wherein only one out of said first area and said second area is located on one side of said longitudinal central axis (X).

14. A stack according to claim 1, wherein one of said first area and said second area comprises hooks, and the other of said first area and said second area.

15. A stack according to claim 1, wherein said first connector and second connector, each have a height of less than 2 mm.

16. A stack in accordance with claim 1, wherein said stack comprises a first continuous web material divided into individual sheets by means of weakening lines, and a second web material divided into individual sheets by means of weakening lines, said first and second webs being interfolded with one another so as to form said stack, and first and second webs are arranged such that said weakening lines of said first web and said weakening lines of said second web are offset with respect to each other along the webs.

17. A stack in accordance with claim 16, wherein said connector is attached to said stack by an attachment which simultaneously accomplishes interconnection of said first and second webs at said connector.

18. A stack in accordance with claim 1, wherein, in said first and /or said second connector, said first area is provided by a first connector material, and said second area is provided by a second connector material.

19. A stack in accordance with claim 18, wherein, for said first and /or said second connector, said first connector material is attached to said second connector material, and said second connector material is attached to the respective end surface of said stack.

20. A stack in accordance with claim 18, wherein said first and/or second connector comprises a carrier material, onto which said first and/or second connector material is attached, said carrier material being attached to the respective end surface of said stack.

21. A stack in accordance with claim 18, wherein said first connector material, said second connector material, said carrier material, or said single continuous connector material, respectively, is band-shaped.

22. A stack in accordance with claim 1, wherein, in said first and/or second connector, said first area and said second area is provided by a single continuous connector material.

23. A stack in accordance with claim 1, wherein said continuous web material is provided with weakening lines, dividing said web material into individual sheets.

24. A stack of web material for hygiene products, for use in a dispenser, comprising
at least one continuous web material being Z-folded about transverse folding lines, thereby providing panels having a length (L) and a width (W),
said panels being piled on top of each other to form a height (H) of said stack extending between a first end surface and a second end surface of said stack, and said first end surface being provided with a first connector, and said second end surface being provided with a second connector,
wherein at least one of said first and second connectors comprises
a first area consisting of first mechanical connector structures,
a second area consisting of second mechanical connector structures, and
a third area consisting of second mechanical connector structures,
said first and second mechanical connector structures being two corresponding structures, each structure being capable of forming a mechanical interconnection with said other structure, and being incapable of forming a mechanical interconnection with an identical structure, whereby said at least one of said first and second connectors is mechanically connectable to another connector of another stack of web material, said another connector comprising said area consisting of first and/or second mechanical connector structures,
wherein said first and second end surfaces each define a longitudinal central axis (X), extending in parallel to said length (L), and centrally in relation to said width (W) of said stack,
wherein said first and second end surfaces each define a transversal central axis (Y), extending in parallel to said width (W), and centrally in relation to said length (L) of said stack,
wherein said first area is located on a first side of said longitudinal central axis (X) and on a first side of said transversal central axis (Y),
wherein said first area mirrors said second area about said longitudinal central axis (X), wherein said second area is located on a second side of said longitudinal central axis (X), and on said first side of said transversal central axis (Y), and wherein said first area mirrors said third area about said transversal central axis (Y), wherein said third area is located on a second side of said transversal central axis (Y), and on said first side of said longitudinal central axis (X).

* * * * *